Patented Nov. 21, 1950

2,531,279

UNITED STATES PATENT OFFICE 2,531,279

THIOPHENES FROM SULFUR DIOXIDE AND HYDROCARBONS

Kenneth L. Kreuz, Beacon, N. Y., assignor to The Texas Company, New York, N. Y., a corporation of Delaware No Drawing. Application December 29, 1944, Serial No. 570,465

12 Claims. (Cl. 260—329)

This invention relates to the production of heterocyclic organic sulfur compounds, and especially to the production of thiophenes; i. e., thiophenes itself and substituted thiophenes.

This application is a continuation-in-part of my application Serial No. 556,905, filed October 2, 1944.

Various reactions have been proposed in the past for the production of heterocyclic sulfur compounds, such as thiophene and its homologues, but these reactions have been useful only for small scale laboratory preparations. The compounds of this series are found as impurities in coal-tar hydrocarbons of corresponding boiling points, but no practical methods have been developed for their removal from such hydrocarbons without chemical change. As a result, so far as known, up to the present time there has been no commercial source of this group of potentially important organic compounds.

An object of the present invention is to provide an improved process for the synthesis of heterocyclic sulfur compounds.

Another object of the invention is to provide a process for the production of thiophene and substituted thiophenes from organic compounds as defined below.

Another object of the invention is to provide a process for the production of sulfur compounds of the thiophene series from acyclic hydrocarbons.

A further object of the present invention is to provide a vapor phase catalytic process for the production of thiophene, adapted for large scale commercial operation.

Additional objects and advantages of the invention will be evident from the following description.

It has been discovered in accordance with the invention that a thiophene can be produced in good yields by reacting an organic compound having a straight chain of at least four carbon atoms with an oxide of sulfur in the vapor phase and in the presence of silica gel as the catalyst. It has been found, for example, that by passing normal butane with sulfur dioxide in the vapor phase at a temperature of 700° F., for example between 700° F. and 1400° F., preferably between 900° F. and 1200° F., and especially from 1000° F. to 1100° F., over a catalyst consisting essentially of silica gel at a relatively low space velocity thiophene is produced in excellent yields and may be recovered easily from the remainder of the products of the reaction.

The silica gel catalysts that may be employed in accordance with the invention may be prepared in any suitable manner adapted to produce porous gel materials. For example, the familiar methods of producing silica gels, such as the method involving treating an alkali metal silicate with an acid to precipitate silica gel, filtering, washing and drying, may be used. The catalysts may include other materials in addition to the silica gel. My application Serial No. 556,905 and my application Serial No. 570,464, filed of even date herewith, both now abandoned, disclose a variety of catalysts that may be employed in the present reaction. The catalysts are in general metal and metalloid oxides and sulfides that are stable under the reaction conditions and include such compounds as chromia, molybdena. alumina, vanadia, boria, titania, magnesia, molybdenum sulfide, nickel sulfide, tungsten sulfide, cobalt sulfide and tin sulfide. The catalysts employed in accordance with the invention may include in addition to the silica one or more compounds of this type.

In general, however, it has been found that silica gel alone is an active, economical catalyst which may be handled efficiently. The high activity of silica gel as a catalyst for the reaction is surprising because the reaction involves dehydrogenation. Silica gel has never displayed important activity in dehydrogenation reactions of the type where a hydrocarbon in vapor form is passed into contact with a catalyst at an elevated temperature, and therefore alone is not considered a dehydrogenation catalyst. In the present process silica gel is effective to direct the reaction toward the formation of heterocyclic compounds and therefore may be regarded as a heterocyclization catalyst.

The process of the invention is especially applicable to the production of thiophene itself or thiophene homologues having acyclic substituents. To produce thiophene compounds of this class the charge material is preferably a saturated or unsaturated acyclic hydrocarbon having at least four carbon atoms in a straight chain, or a mixture of hydrocarbons containing a substantial proportion of hydrocarbons of this type. Where the charge hydrocarbon contains more than four carbon atoms, thiophene and a thiophene homologue or homologues are produced in which the remaining carbon atoms are present in a side chain or chains. Low molecular weight hydrocarbons such as are produced in a petroleum refinery constitute suitable charge stocks for the production of thiophene compounds of the type in question. Such mixtures need not be separated to obtain individual hydrocarbon compounds, but it is usually desirable to employ a narrow fraction composed essentially of hydrocarbons having the same number of carbon atoms. Thus a butane-butene fraction containing straight chain compounds may be employed as a charge stock for the production of thiophene and a pentane-pentene fraction containing compounds in which at least four carbon atoms are in a straight chain for the production of methyl thiophenes. As examples of other hydrocarbons that may be employed as charge stocks there may be mentioned butadiene and hexanes and heptanes, which contain at least four carbon atoms in a straight chain. There appears to be no upper limit on the number of carbon atoms the compounds may contain, although they should be in vapor form under the reaction conditions. When relatively simple reaction products are desired, however, the hydrocarbons preferably should contain from four to ten carbon atoms.

The invention also includes processes in which substituted acyclic hydrocarbons having a straight chain of at least four carbon atoms are employed as the charge materials. These compounds should contain substituents which either remain stably attached to the compound during the reaction or which are removed during the reaction to form compounds which do not have a substantial adverse effect on the reaction. As examples of suitable compounds there may be mentioned aryl substituted acyclic hydrocarbons such as phenyl or naphthyl butane or pentane; halogenated aliphatic compounds, such as chlorbutane or chlorpentane; and saturated or unsaturated aliphatic alcohols having at least four carbon atoms in a straight chain.

I prefer to employ sulfur dioxide as the sulfur oxide in the process but sulfur trioxide may also be used. These oxides are usually employed in the free state; but they may be employed in combined form such as in the form of their hydrates. The hydrates, for example, decompose at the reaction temperature to yield a charge mixture comprising the sulfur oxide and a hydrocarbon together with steam which serves as a diluent in the mixture.

The process of the invention is preferably carried out by mixing the sulfur oxide in vapor form with the vaporized charge material and passing the mixed vapors in contact with the catalyst. When proceeding in this way, the space velocity (liquid volumes of charged compound per volume of catalyst per hour) and mol ratio of sulfur dioxide to charged compound are important factors. The reaction between sulfur dioxide and hydrocarbons has been proposed as a process for the production of alkadienes. I have found that to produce predominantly thiophene compounds, using a given charge material and temperature, the space velocity should be lower and the mol ratio should be higher than in a case where it is desired to produce predominantly di-olefinic compounds.

The reaction conditions to produce maximum amounts of thiophene compounds and minimum amounts of compounds having di-olefinic linkages will vary depending primarily upon the charge material. In general, however, it may be stated that to produce thiophene compounds the space velocity should be a fraction of the space velocity which results in large amounts of the corresponding diolefinic compounds. For example, to produce thiophene from sulfur dioxide and butane or butene at a temperature of about 1100° F. the optimum space velocity is about one-sixth the optimum space velocity for the production of butadiene. Also, the mol ratio of sulfur dioxide to charge material should be greater for thiophene compound production than for di-olefinic compound production, in the case of any particular charge material. To illustrate this: the optimum mol ratio to produce thiophene from butene at a temperature of about 1100° F. appears to be about 1.0, whereas the optimum mol ratio to produce butadiene is about 0.25–0.5. Also, using the same conditions but charging normal butane the optimum mol ratio for thiophene is about 1.5 whereas the optimum for butadiene is about 1.0.

It will be understood, therefore, that the optimum conditions will vary with each charge material. In general, the space velocity should lie within the range 0.3 to 5 regardless of the composition of the charge material, the higher space velocities being employed with the higher molecular weight charge materials. However, when charging saturated compounds, e. g. paraffin hydrocarbons, it is preferred to employ a space velocity within the range 0.3 to 4. The mol ratio of sulfur oxide to charge material should be at least 0.3 for all compounds and is preferably at least 0.5 for the saturated compounds, mol ratios between 1 and 3 being preferred in each case. Examples of suitable and optimum conditions of operation may be helpful in understanding the invention. When charging normal butane the space velocity should be within the range 0.3 to 4 and preferably should be 1 to 1.5; the mol ratio of sulfur dioxide to butane should be at least 0.5 and preferably 1.4 to 1.5; and the temperature should be 700° to 1400° F. and preferably 1100° F. On the other hand, when charging butene the space velocity should lie within the range 0.3 to 5 and preferably should be 1.5 to 2.0; the mol ratio of sulfur dioxide to butene should be at least 0.3 and preferably about 1.0 and the temperature should be 700° F. to 1400° F., preferably about 1000° F. It will be understood that the conditions described as optimum are those which result in maximum production of thiophene in a once-through process. Where the hydrocarbon products are recycled it may be desirable to maintain other conditions during the reaction.

The catalyst life for optimum thiophene production will depend to some extent on the charge stock and reaction conditions employed, but will generally be one or more hours. In any case, periodic determinations of thiophene yields will indicate the practical period of catalyst life before reactivation. When employing butane charge stocks, this period will usually be of the order of 3–4 hours, after which the thiophene yields will fall off sharply. The catalyst in this condition may be reactivated for thiophene production by conventional methods, as by burning off the deactivating catalyst deposits.

As previously indicated, the temperature of the reaction may be varied. It has been found that the temperature may be varied. It has been found that the temperature should be varied primarily depending upon the nature of the charge material. Somewhat higher temperatures are generally desirable for low molecular weight charge stocks than are required for higher molecular weight charge stocks. I prefer to use a temperature of about 1100° F. for a butane charge stock, and a temperature of about 1000° F. for a pentane charge stock. The optimum temperature range is quite narrow for any particular charge stock. Adequate temperature control should therefore be provided in the catalyst zone.

When sulfur dioxide is reacted with an acyclic hydrocarbon containing at least four carbon atoms in a straight chain in the presence of a catalyst consisting essentially of silica gel under conditions resulting in the production of an alkadiene in substantial yields it may be that a small amount of thiophene will also be produced. If the process is carried out in a manner involving removing the sulfur compounds from the reaction products by passing the products through a solvent solution, any thiophene in these products becomes a part of the waste materials and is lost. On the other hand, when the reaction is carried out so as to produce substantial amounts of a thiophene, or even relatively small amounts, and it is known, as a result of my invention, that thiophene is a reaction product, the separation and recovery of thiophene may be accomplished easily. For example, the reaction products, which may comprise unreacted charge material, cracked products of the charge material, olefinic compounds, small amounts of di-olefinic compounds, unreacted sulfur oxide, and reduction products of the sulfur oxide, may be passed through a cold caustic soda solution to dissolve sulfur compounds soluble in the solution and to condense a liquid material which initially may be intimately admixed with the solution. Upon permitting the solution to stand under quiescent conditions, it separates into two layers one of which is a crude thiophene. A relatively pure thiophene or mixture of thiophenes may be recovered from the crude material by distillation.

The thiophene compounds may also be recovered in crude form by a simple condensation procedure which may involve passing the products into a cooled body of hydrocarbon oil such as kerosene, in which the thiophene condenses, and then distilling the mixture of thiophene and hydrocarbon oil to recover the thiophene. Any di-olefinic compounds present in the reaction product may be recovered from the remaining mixture by conventional methods such as extractive distillation. Unreacted sulfur oxides, hydrogen sulfide, and sulfur may be recovered from the reaction products by conventional methods and the reduced products may be reoxidized for recycling in the process.

It is evident that the process may be operated in accordance with any of the usual techniques for high temperature catalytic conversion. Thus, fixed catalysts beds may be used alternately in reaction and reactivation cycles, or "fluid catalyst" operation may be used, with continuous reactivation and recycle of a powdered catalyst. It will be understood that although the foregoing discussion and the following examples are concerned with fixed bed operation, the optimum conditions when using another type of operation will correspond to those described.

My invention will be further illustrated by the following specific examples:

Example I

Normal butane and sulfur dioxide in a mol ratio of approximately 1.5 mols of sulfur dioxide per mol of butane were mixed, preheated to approximately reaction temperature, and charged to a catalytic reaction zone maintained at an average temperature of about 1108° F. and at atmospheric pressure. The catalyst employed was a commercial hydrated silica gel. Before use the silica gel was dried at 250° F., ground to 6 to 30 mesh and calcined at 1000° F. for three hours. The butane charge rate was approximately one volume of liquid butane per volume of catalyst per hour.

The reaction product from a run of two hours was fractionated to recover thiophene, which was obtained in a yield of 30% of the weight of the butane charge. The amounts of $C_4$ hydrocarbons in the product indicated that the ultimate yield in a continuous cyclic process would be 42%.

In three other runs carried out under substantially the same conditions as above, the results were in run a yield per pass: 34.2%, indicated ultimate yield 51.2%; run b yield per pass 31.7%, indicated ultimate yield 62.1%; and run c yield per pass 25.4%, indicated ultimate yield 57.3%.

Example II

The silica gel catalyst of Example I was used in this example. The charge hydrocarbon was 2-butene and the general conditions of operation were as described in Example I. The temperature was about 1009° F., the space velocity was 0.9, and the mol ratio of sulfur dioxide to 2-butene was 1.0. The yield of crude thiophene per pass was 22% and the indicated ultimate yield was 27%.

Those skilled in the art will understand that the temperatures mentioned in the examples are the average of the temperatures determined at selected points in the catalyst bed and over the course of the run. As in other conversion reactions, the temperature of the catalyst bed is not the same throughout. In carrying out the processes described in the examples, in which the reactants were passed downwardly through the reactor, the temperature was measured at the top of the catalyst bed, the middle of the bed and the bottom of the bed, and the average of these figures is considered as the temperature of the reaction zone at the time. The temperature in all cases at the top of the bed was below the average, the temperature at the middle was generally above the average, and the temperature at the bottom of the bed was about the same as the average. While these temperatures remained relatively constant during a run, they varied somewhat due to the fact that there was a hot area in the bed which tended to move down as the run proceeded.

It will be understood, of course, that these examples are merely illustrative of the invention and that other catalysts consisting essentially of silica gel, charge stocks, and specific conditions may be employed as previously described. By using selected charge stocks thiophenes containing various substituents may be produced by the present process.

Obviously many modifications and variations of the invention as hereinbefore set forth may be made without departing from the spirit and scope thereof, and only such limitations should be imposed as are indicated in the appended claims.

I claim:

1. The process for the production of a thiophene which comprises passing sulfur dioxide and a hydrocarbon having an aliphatic straight chain of at least four carbon atoms in proportions corresponding to a mol ratio of sulfur dioxide to said organic compound of at least 0.3 in vapor phase and at an elevated temperature of at least 700° F. in contact with a silicon gel catalyst at a space velocity less than 5 to form reaction products comprising a thiophene, and recovering a thiophene from the reaction products.

2. The process for the production of a thiophene which comprises passing sulfur dioxide and a paraffin hydrocarbon having a straight chain of at least four carbon atoms in proportions corresponding to a mol ratio of sulfur dioxide to said hydrocarbon of at least 0.5 in vapor phase and at an elevated temperature within the range 900° to 1200° F. in contact with a silica gel catalyst at a space velocity of 0.3 to 4, and recovering a thiophene from the reaction products.

3. The process for the production of a thiophene which comprises passing sulfur dioxide and an unsaturated hydrocarbon having an aliphatic straight chain of at least four carbon atoms in proportions corresponding to a mol ratio of sulfur dioxide to said hydrocarbon of at least 0.3 in vapor phase and at an elevated temperature within the range 900° to 1200° F. in contact with a silica gel catalyst at a space velocity of 0.3 to 5, and recovering a thiophene from the reaction products.

4. The process for the production of a thiophene which comprises passing sulfur dioxide and a paraffin hydrocarbon having a straight chain of at least four carbon atoms in proportions corresponding to a mol ratio of sulfur dioxide to said hydrocarbon of about 1 to 3 in vapor phase and at an elevated temperature within the range 1000° to 1100° F. in contact with a silica gel catalyst at a space velocity of 0.3 to 4, and recovering a thiophene from the reaction products.

5. The process for the production of a thiophene which comprises passing sulfur dioxide and an unsaturated hydrocarbon having an aliphatic straight chain of at least four carbon atoms in proportions corresponding to a mol ratio of sulfur dioxide to said hydrocarbon of about 1 to 3 in vapor phase and at an elevated temperature within the range 1000° to 1100° F. in contact with a silica gel catalyst at a space velocity of about 0.3, to 5, and recovering a thiophene from the reaction products.

6. The process for the production of a thiophene which comprises passing sulfur dioxide and a hydrocarbon containing four to ten carbon atoms and having an aliphatic straight chain of at least four carbon atoms in proportions corresponding to a mol ratio of sulfur dioxide to said hydrocarbon of at least 0.3 in vapor phase and at an elevated temperature within the range 900° to 1200° F. in contact with a silica gel catalyst at a space velocity of 0.3 to 5, and recovering a thiophene from the reaction products.

7. The process for the production of thiophene which comprises reacting sulfur dioxide and normal butane in vapor phase and at an elevated temperature within the range 700° to 1400° F. in the presence of a silica gel catalyst at a space velocity less than 5, and recovering thiophene from the reaction products.

8. The process for the production of thiophene which comprises passing sulfur dioxide and normal butane in proportions corresponding to a mol ratio of sulfur dioxide to normal butane of at least 0.5 in vapor phase and at an elevated temperature within the range 900° to 1200° F. in contact with a silica gel catalyst at a space velocity of 0.3 to 4, and recovering thiophene from the reaction products.

9. The process for the production of thiophene which comprises passing sulfur dioxide and normal butane in proportions corresponding to a mol ratio of sulfur dioxide to normal butane of about 1.5 in vapor phase and at an elevated temperature of about 1100° F. in contact with a catalyst consisting of silica gel at a space velocity of 1 to 1.5, and recovering thiophene from the reaction products.

10. The process for the production of thiophene which comprises reacting sulfur dioxide and a straight chain butene at an elevated temperature within the range 700° to 1400° F. in the presence of a silica gel catalyst at a space velocity less than 5, and recovering thiophene from the reaction products.

11. The process for the production of thiophene which comprises passing sulfur dioxide and a straight chain butene in proportions corresponding to a mol ratio of sulfur dioxide to said butene of at least 0.3 in vapor phase and at an elevated temperature within the range 900° to 1200° F. in contact with a silica gel catalyst at a space velocity of 0.3 to 5, and recovering thiophene from the reaction products.

12. The process for the production of thiophene which comprises passing sulfur dioxide and a straight chain butene in proportions corresponding to a mol ratio of sulfur dioxide to said butene of about 1.0 in vapor phase and at an elevated temperature of about 1000° F. in contact with a catalyst consisting of silica gel at a space velocity of about 1.5 to 2, and recovering thiophene from the reaction products.

KENNETH L. KREUZ.

REFERENCES CITED

The following references are of record in the file of this patent:

UNITED STATES PATENTS

| Number | Name | Date |
|---|---|---|
| 1,975,476 | Pier | Oct. 2, 1934 |
| 1,998,626 | Koenig | Apr. 23, 1935 |
| 2,126,817 | Rosen | Aug. 16, 1938 |
| 2,336,916 | Arnold | Dec. 14, 1943 |